(12) United States Patent
Okada et al.

(10) Patent No.: US 9,988,082 B2
(45) Date of Patent: Jun. 5, 2018

(54) TRAVELING PATH ESTIMATION APPARATUS

(71) Applicant: DENSO CORPORATION, Kariya, Aichi-pref. (JP)

(72) Inventors: Masaya Okada, Nishio (JP); Naoki Kawasaki, Nishio (JP); Shunsuke Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/097,167

(22) Filed: Apr. 12, 2016

(65) Prior Publication Data

US 2016/0304120 A1    Oct. 20, 2016

(30) Foreign Application Priority Data

Apr. 14, 2015  (JP) ................................ 2015-082340

(51) Int. Cl.
*B62D 6/00* (2006.01)
*G06K 9/00* (2006.01)

(52) U.S. Cl.
CPC ......... *B62D 6/002* (2013.01); *G06K 9/00798* (2013.01)

(58) Field of Classification Search
None
See application file for complete search history.

(56) References Cited

U.S. PATENT DOCUMENTS

| | | | | |
|---|---|---|---|---|
| 2002/0161510 A1* | 10/2002 | Matsuura | ........... | B60K 31/0066 701/41 |
| 2003/0001732 A1 | 1/2003 | Furusho | | |
| 2009/0265062 A1* | 10/2009 | Nguyen Van | ........ | B62D 5/0463 701/42 |
| 2010/0004822 A1* | 1/2010 | Okuda | ................. | B62D 5/0466 701/41 |
| 2010/0076640 A1* | 3/2010 | Maekawa | ............ | G05D 1/0217 701/26 |
| 2011/0010021 A1* | 1/2011 | Kobayashi | .......... | B60T 8/17557 701/1 |

(Continued)

FOREIGN PATENT DOCUMENTS

| | | |
|---|---|---|
| JP | H08-261156 A | 10/1996 |
| JP | 2002-352226 A | 12/2002 |
| JP | 2006-285493 A | 10/2006 |

*Primary Examiner* — Rami Khatib
(74) *Attorney, Agent, or Firm* — Knobbe, Martens, Olson & Bear, LLP

(57) ABSTRACT

A traveling path estimation apparatus includes a calculation section that calculates a traveling marking line marking a lane of a road, on which a vehicle runs, based on a front image acquired by a camera mounted in the vehicle, an estimation section that estimates road parameters including a curvature and a curvature change rate of the lane, the estimation section estimating the road parameters at current time based on the traveling marking line calculated by the calculation section and the road parameters previously estimated, a determination section that determines departure of the vehicle from a curve of the lane, and a reset section that, when the determination section determines the departure of the vehicle, resets at least the curvature change rate included in the road parameters previously estimated by the estimation section.

11 Claims, 5 Drawing Sheets

(56) References Cited

U.S. PATENT DOCUMENTS

| | | | |
|---|---|---|---|
| 2011/0295548 A1* | 12/2011 | Takabayashi | G06K 9/00798 702/142 |
| 2015/0151725 A1* | 6/2015 | Clarke | B60W 30/00 701/28 |
| 2015/0262020 A1* | 9/2015 | Kataoka | G06K 9/00798 382/104 |
| 2015/0269445 A1* | 9/2015 | Ueda | G06K 9/00798 348/118 |
| 2015/0274164 A1* | 10/2015 | Terazawa | B60W 30/12 701/41 |
| 2015/0294571 A1* | 10/2015 | Shida | G08G 1/161 701/409 |
| 2016/0052547 A1* | 2/2016 | Kashiwai | B60W 30/10 701/41 |
| 2016/0152234 A1* | 6/2016 | Kim | B60W 30/09 701/41 |

* cited by examiner

TRAVELING PATH ESTIMATION APPARATUS

CROSS-REFERENCE TO RELATED APPLICATION

This application is based on and claims the benefit of priority from earlier Japanese Patent Application No. 2015-82340 filed Apr. 14, 2015, the description of which is incorporated herein by reference.

BACKGROUND

Technical Field

The present invention relates to a traveling path estimation apparatus that estimates a traveling path of a vehicle based on images acquired by an in-vehicle camera.

Related Art

Generally, a road includes curve sections having constant curvatures, straight line sections, and clothoid curve sections having constant curvature change rates for smoothly connecting between the curve section and the straight line section. According to JP-A-8-261756, when estimating road parameters, the traveling lane recognition apparatus estimates a curvature change rate in addition to a curvature, considering the fact that the curvature of a curve changes depending on a clothoid curve.

As in the case of the traveling lane recognition apparatus disclosed in JP-A-8-261756, estimating a curvature change rate improves accuracy in estimation of a curvature of a clothoid curve section. However, in a case where the curvature change rate is estimated, when a vehicle departs from a curve of a lane, an estimation value of the curvature is calculated by using a predicted value of the curvature change rate affected by the clothoid curve section. Hence, overshoot easily occurs.

SUMMARY

An embodiment provides a traveling path estimation apparatus that can increase accuracy in estimating a curvature when a vehicle departs from a curve of a lane.

As an aspect of the embodiment, a traveling path estimation apparatus includes: a calculation section that calculates a traveling marking line marking a lane of a road, on which a vehicle runs, based on a front image acquired by a camera mounted in the vehicle; an estimation section that estimates road parameters including a curvature and a curvature change rate of the lane, the estimation section estimating the road parameters at current time based on the traveling marking line calculated by the calculation section and the road parameters previously estimated; a determination section that determines departure of the vehicle from a curve of the lane; and a reset section that, when the determination section determines the departure of the vehicle, resets at least the curvature change rate included in the road parameters previously estimated by the estimation section.

DETAILED DESCRIPTION OF THE PREFERRED EMBODIMENTS

Figure 1:
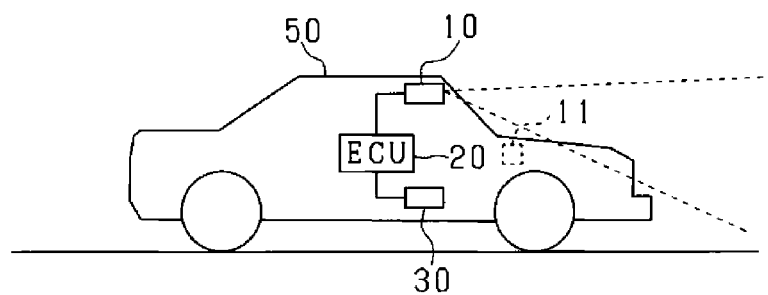
FIG. 1 is a view illustrating a position at which an in-vehicle camera is mounted.

With reference to the accompanying drawings, hereinafter are described embodiments of a traveling path estimation apparatus. Throughout the drawings, components identical with or similar to each other are given the same reference numerals for the sake of omitting unnecessary explanation.

First Embodiment

Figure 2:
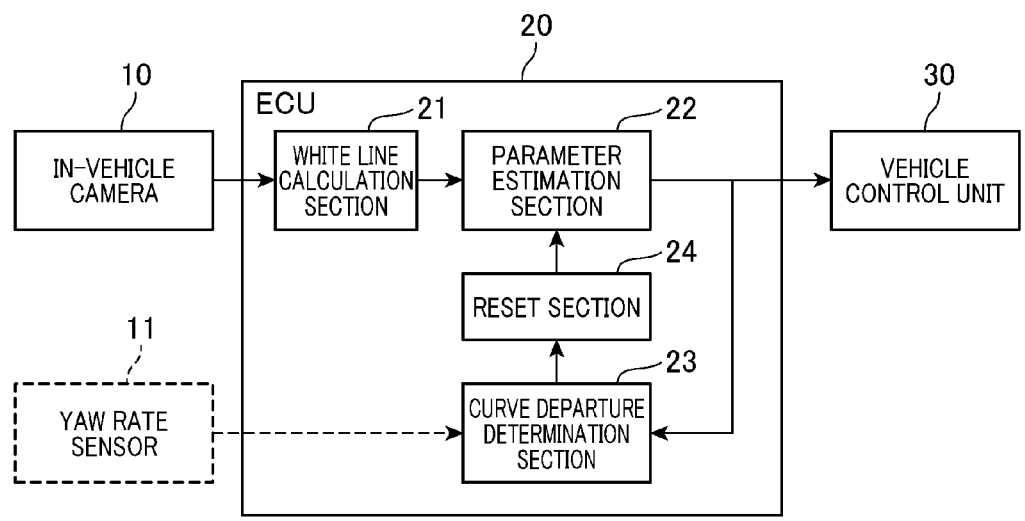
FIG. 2 is a block diagram illustrating functions of a traveling path estimation apparatus.

With reference to FIGS. 1 and 2, a traveling path estimation apparatus according to the present embodiment will be described. The traveling path estimation apparatus includes an ECU (electronic control unit) 20 and a vehicle control unit 30.

An in-vehicle camera 10 is configured by at least one of a CCD image sensor, a CMOS image sensor and the like. As shown in FIG. 1, the in-vehicle camera 10 is mounted, for example, in the vicinity of the upper edge of the windshield of a vehicle 50 and substantially at the middle in the vehicle width direction. The in-vehicle camera 10 acquires an image of an area extending at a predetermined angle and ahead of the vehicle 50. That is, the vehicle 50 acquires an image of a circumferential environment including the road ahead of the vehicle 50.

The vehicle control unit 30 (control means) includes a steering actuator and a braking actuator. The vehicle control unit 30 performs steering control and brake control of the vehicle 50 based on a steering angle and braking force set by using road parameters estimated by the ECU 20.

The ECU 20 recognizes a white line (traveling marking line) marking a lane, on which the vehicle 50 runs, into the right side and the left side based on a front image acquired by the in-vehicle camera 10. The ECU 20 is configured by a computer including a CPU, a RAM, a ROM, an I/O, and a storage unit. The CPU executes various programs stored in the ROM to realize each function of a white line calculation section 21, a parameter estimation section 22, a curve departure determination section 23, and a reset section 24.

The white line calculation section 21 (calculation means) calculates a white line marking the lane, on which the vehicle 50 runs, based on an image of an area ahead of the vehicle 50 acquired by the in-vehicle camera 10. Specifically, the white line calculation section 21 detects edge points, which form the white line, from the image to calculate coordinates of the edge points on an image plane. The image plane coordinates provide a coordinate system, where the horizontal direction on the image plane is defined as an m axis, and the vertical direction on the image plane is defined as an n axis. The calculated coordinates (m, n) are used as a current observed value.

The parameter estimation section 22 (estimation means) estimates road parameters of a lane in which the vehicle 50 runs. The parameter estimation section 22 estimates current road parameters based on the white line detected by the white line calculation section 21 and predicted values of road parameters predicted from the road parameters previously estimated (in the past). Specifically, the parameter estimation section 22 uses a Kalman filter (specifically, extended Kalman filter) to estimate road parameters including a curvature of a lane (hereinafter, referred to as lane curvature) ρ1 and a curvature change rate ρ2. The estimated road parameters include, for example, a lane position yc, a lane inclination φ, the lane curvature ρ1, the curvature change rate ρ2, a lane width W, and a pitch angle β.

Hereinafter, with reference to FIG. 3 and expressions (1) to (11), the Kalman filter and calculation of the road parameters using the Kalman filter will be summarized. Expression (1) shows a relationship between calculated coordinates P (m, n) of edge points of a white line and road parameters (yc, φ, ρ1, ρ2, W, β) to be estimated. Note that h0 is a height of the in-vehicle camera 10 from a road surface, and f is a focal length of the in-vehicle camera 10. The expression (1) is used for an observation equation when the Kalman filter is formed.

$$m = -\frac{f^2 h_0}{2(f\beta + n)}\rho 1 - \frac{f^3 h_0^2}{6(f\beta + n)^2}\rho 2 + f\phi + \left(\frac{f\beta + n}{h_0}\right)\left(y_c \pm \frac{W}{2}\right) \quad (1)$$

Next, a state vector xk at the time point k (k=0, 1, ..., N) is shown as the following expression (2). In the expression (2), T indicates a transposed matrix.

$$x_k = (y_c, \varphi, \rho 1, \rho 2, W, \beta)^T \quad (2)$$

In this case, a state equation and an observation equation are expressed by the following expressions (3) and (4).

$$x_{k+1} = F_k x_k + G_k w_k \quad (3)$$

$$y_k = h_k(x_k) + v_k \quad (4)$$

where yk is an observation vector, Fk is a transition matrix, Gk is a driving matrix, wk is system noise, hk is an observation function, and vk is observation noise.

Then, Kalman filters applied to the expressions (3) to (4) are expressed as the following expressions (5) to (9).

$$\hat{x}_{k|k} = \hat{x}_{k|k-1} + K_k(y_k - h_k(\hat{x}_{k|k-1})) \quad (5)$$

$$\hat{x}_{k+1|k} = F_k \hat{x}_{k|k} \quad (6)$$

$$K_k = \hat{P}_{k|k-1} H_k^T (H_k \hat{P}_{k|k-1} H_k^T + R_k)^{-1} \quad (7)$$

$$\hat{P}_{k|k} = \hat{P}_{k|k-1} - K_k H_k \hat{P}_{k|k-1} \quad (8)$$

$$\hat{P}_{k+1|k} = F_k P_{k|k} F_k^T + G_k Q_k G_k^T \quad (9)$$

In the expressions (5) to (9), Kk is a Kalman gain, and Rk is a covariance matrix of the observation noise vk. Qk is a covariance matrix of the system noise wk. Hk is an observation matrix shown by expression (10).

$$H_k = \left(\frac{\partial h_k}{\partial x_k}\right)_{x_k = x_{k|k-1}} \quad (10)$$

Figure 3:
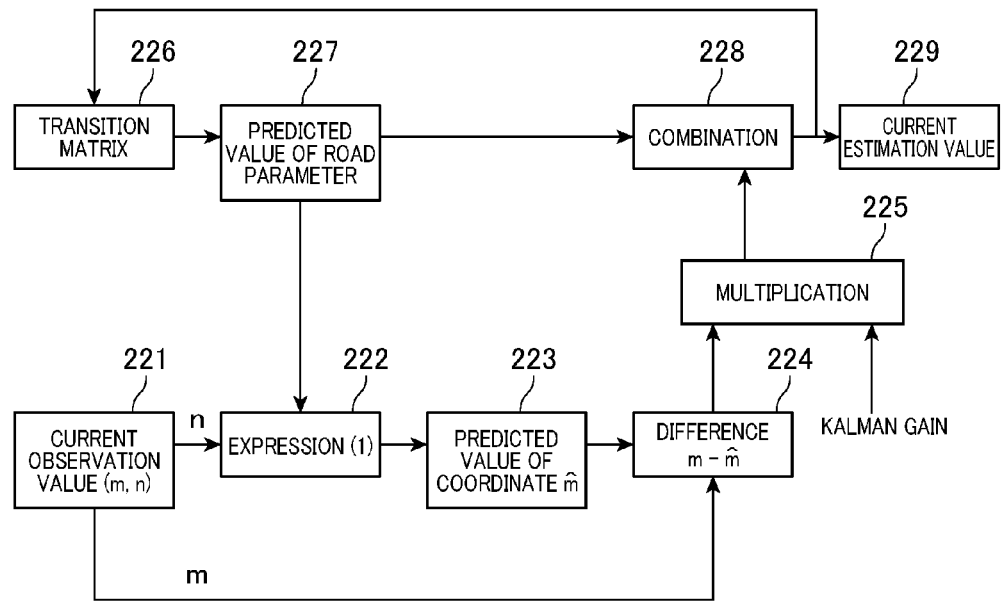
FIG. 3 is a block diagram illustrating calculation of a road parameter using a Kalman filter.

In FIG. 3, first, in block 226, as shown in the expression (3), the transition matrix Fk is applied to a previous estimation value of the road parameter, so that the previous estimation value is converted into a current predicted value of the road parameter. Then, in block 227, a predicted value of the road parameter is obtained. The predicted value is predicted from the previous estimation value on the road parameter. In block 221, a current observation value (m, n) is obtained which is calculated by the white line calculation section 21. In block 222, the current predicted value of the road parameter obtained in block 227 is converted into a current predicted value of the m coordinate by using the n coordinate value of the current observation value obtained in block 221 and expression (1). In block 223, the current predicted value of the m coordinate is obtained.

Next, in block 224, as shown in the parentheses of the second term of the right-hand side of expression (5), the difference between the current observation value of the m coordinate obtained in block 221 and the predicted value of the m coordinate obtained in block 223 is calculated. In block 225, as shown in the second term of the right-hand side of expression (5), the difference calculated in block 224 is multiplied by the Kalman gain Kk to calculate the difference weighted with the Kalman gain Kk. In block 228, the predicted value of the road parameter obtained in block 227 is combined with the difference weighted with the Kalman gain Kk in block 225 to calculate a current estimation value of the road parameter. This corresponds to the addition of the first term and the second term of the right-hand side of expression (5). In block 229, a current estimation value of the road parameter corresponding to the left-hand side of expression (5) is obtained.

As described above, the road parameter at a predetermined time point k is obtained by addition of the predicted value at predetermined time point k which is predicted from the road parameter at the more recent time point k−1 and the value obtained by weighting the difference between the predicted value and the observation value of the road parameter at the predetermined time point k with the Kalman gain Kk. That is, when the predetermined time point k is defined as the present time point, the parameter estimation section 22 calculates a current estimation value of the road parameter based on the previously estimated road parameter and the white line calculated by the white line calculation section 21.

Figure 4:
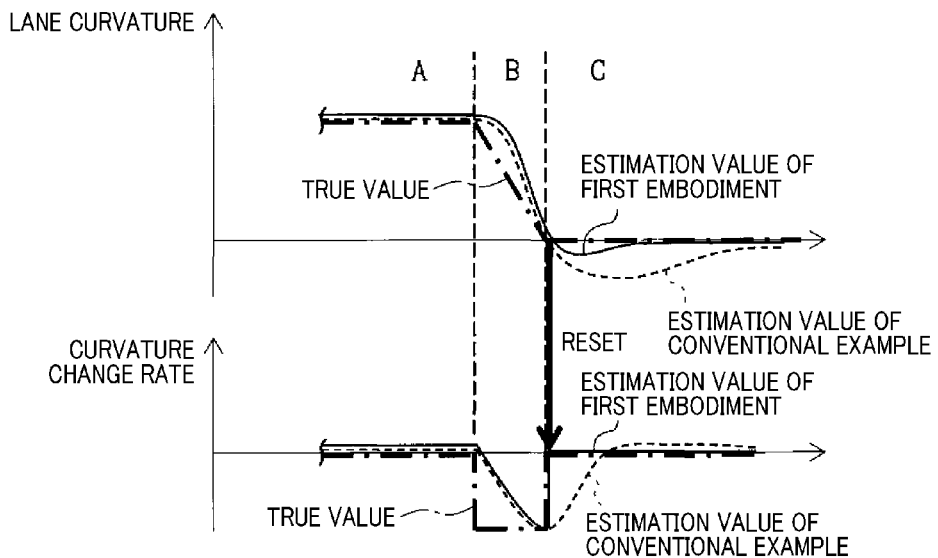
FIG. 4 is a diagram illustrating estimation values of a curvature of a lane and a curvature change rate according to a first embodiment, estimation values of a curvature of a lane and a curvature change rate according to a conventional example, and true values of a curvature of a lane and a curvature change rate.

FIG. 4 shows estimation values of the lane curvature ρ1 and the curvature change rate ρ2 according to the present embodiment by solid lines, and shows estimation values of the lane curvature ρ1 and the curvature change rate ρ2 according to a conventional example by broken lines. FIG. 4 shows true values of the lane curvature ρ1 and the curvature change rate ρ2 by alternate long and short dash lines. In addition, FIG. 5 shows behavior of the vehicle 50 in the vicinity of the exit of a curve according to the present embodiment by an arrowed solid line, and shows behavior of the vehicle 50 in the vicinity of the exit of the curve according to the conventional example by an arrowed broken line.

Figure 5:
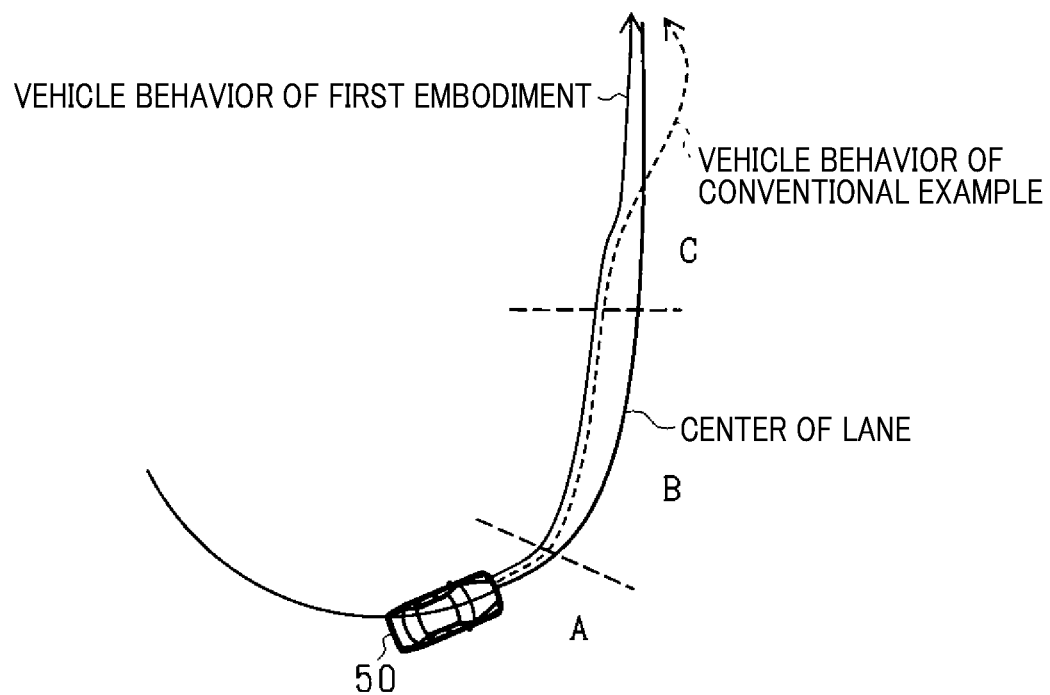
FIG. 5 is a diagram illustrating behavior of a vehicle in the vicinity of the exit of a curve according to the first embodiment and behavior of the vehicle according to a conventional example.

As shown in FIGS. 4 and 5, roads, especially expressways, include a constant curve section indicated by A and having a constant curvature, a clothoid curve section indicated by B and having the lane curvatures ρ1 varying with the constant curvature change rate ρ2, and a straight line section indicated by C. The sections indicated by A and B form a curve section.

In the clothoid curve section, all of the estimation values of the lane curvature ρ1 and the curvature change rate ρ2 of the present embodiment and the estimation values of the lane curvature ρ1 and the curvature change rate ρ2 of the conventional example are affected by the predicted values predicted from the road parameters of the constant curve section and decrease more gently than the true values of the lane curvatures ρ1 and the curvature change rates ρ2. Hence, in the clothoid curve section, the behavior of the vehicles 50 subject to steering control based on the estimated road parameters slightly shifts toward the inner side of the curve (the center side of the curve) with respect to the center of the lane in both the present embodiment and the conventional example.

In the convention example, when the vehicle has moved from the clothoid curve section to the straight line section, all the road parameters are estimated continuously from the clothoid curve section. Hence, the estimation value of the curvature change rate ρ2 immediately after the entrance to the straight line section is affected by the estimation value of the curvature change rate ρ2 of the clothoid curve section, and does not immediately increase to zero, but gently increases to zero. Then, the estimation value of the lane curvature ρ1 immediately after the entrance to the straight line section is affected by the estimation value of the gently increasing curvature change rate ρ2 to temporarily become zero. Thereafter, the estimation value of the lane curvature ρ1 overshoots in the negative direction, and then returns to zero. Hence, according to the conventional example, immediately after the vehicle 50 enters to the straight line, the steering wheel is operated in the direction different from the direction along the curve with respect to the front direction. Thereby, the vehicle 50 runs to the outer side of the curve with respect to the center of the lane and falters.

To address the overshoot of the estimation value of the lane curvature ρ1 when the vehicle 50 departs from the curve, the estimation value of the curvature change rate ρ2 makes the largest contribution among the road parameters estimated in the past. Hence, in the present embodiment, to reduce the falter of the vehicle 50 immediately after the entrance to the straight line, the estimation value of the curvature change rate ρ2 previously estimated (in the past) is reset when the vehicle 50 departs from the curve. In the present embodiment, when the vehicle 50 departs from the curve, the predicted value of the curvature change rate ρ2 predicted from the previously estimated road parameters is reset. Resetting the predicted value of the curvature change rate ρ2 predicted from the previously estimated road parameters is equivalent to resetting the previously estimated curvature change rate ρ2. Instead of resetting the predicted value of the curvature change rate ρ2, the estimation value of the curvature change rate ρ2 previously estimated may be reset.

The curve departure determination section 23 (determination means) determines the departure of the vehicle 50 from a curve of a lane. That is, the curve departure determination section 23 determines whether or not the vehicle 50 has moved to the exit of the curve which is the connecting part of the clothoid curve section and the straight line section. The curve departure determination section 23 determines the departure of the vehicle 50 from the curve by using the lane curvature ρ1 estimated by the parameter estimation section 22. Specifically, the curve departure determination section 23 determines that the vehicle 50 has moved from the curve section to the straight line section at the time point when the estimated lane curvature ρ1 has become zero from a positive value.

In addition, the curve departure determination section 23 may determine the departure of the vehicle 50 from the curve by using a yaw rate of the vehicle 50 and a steering angle of the vehicle 50. The curve departure determination section 23 may determine the departure of the vehicle 50 from the curve by using at least one of the estimated lane curvature ρ1, a yaw rate of the vehicle 50, and a steering angle of the vehicle 50. The yaw rate of the vehicle 50 is detected by a yaw rate sensor 11 mounted in the vehicle 50. In addition, the steering angle of the vehicle 50 is set by using the estimated lane curvature ρ1 and is used for the steering control performed by the vehicle control unit 30. For example, when the yaw rate and the steering angle in the curve section are positive values, the curve departure determination section 23 determines the departure of the vehicle 50 from the curve at the time point when the yaw rate detected by the yaw rate sensor 11 becomes zero from a positive value and at the time point when the steering angle becomes zero from a positive value.

When the curve departure determination section 23 determines that the vehicle 50 has departed from the curve, the reset section 24 (reset means) resets the curvature change rate ρ2 included in the previously estimated road parameters. Specifically, the reset section 24 resets the predicted value of the curvature change rate ρ2 to zero at the time point when the departure of the vehicle 50 from the curve is determined. That is, the influence of the history of the curvature change rate ρ2 in the clothoid curve section is eliminated.

As shown in FIG. 4, in a case where the observation value of the curvature change rate ρ2 is a true value, at the time point when the predicted value of the curvature change rate ρ2 is reset, the estimation value of the curvature change rate ρ2 becomes a true value of zero because the influence of the predicted value is substantially eliminated. Accordingly, in the estimation value of the lane curvature ρ1 immediately after the entrance to the straight line section, overshoot is significantly suppressed compared with the conventional example. Even in the present embodiment, a little bit of overshoot occurs in the estimation value of the lane curvature ρ1 immediately after the entrance to the straight line section, because the predicted value of the lane curvature ρ1 remains which is affected by the road parameters in the clothoid curve section. Hence, as shown in FIG. 5, although the vehicle 50 moves to the outer side of the curve immediately after entering the straight line section compared with when the vehicle 50 runs in the clothoid curve section, the vehicle 50 does not greatly move to the outer side of the curve compared with the conventional example. That is, according to the present embodiment, the falter of the vehicle 50 is reduced immediately after the entrance to the straight line.

Next, a procedure for controlling the vehicle will be described with reference to the flowchart shown in FIG. 6. The procedure is performed by the ECU 20 and the vehicle control unit 30 every time when the in-vehicle camera 10 acquires an image of one frame.

First, the white line calculation section 21 acquires information of an image (image information) of an area ahead of the vehicle 50 acquired by the in-vehicle camera 10 (S10). The white line calculation section 21 applies a Sobel filter or the like to the image information acquired in S10 to extract edge points (S11). The white line calculation section 21 applies the Hough transform to the edge points extracted in S11 (S12) to calculate candidates for a white line (white line candidate) (S13).

Next, the white line calculation section 21 calculates likelihood of a white line of the white line candidates calculated in S13 depending on a recognition distance, consistency of vehicle width, and the degree of the amount of characteristic of the white line such as contrast of the white line with a road surface. Then, for the left side and right side of the vehicle 50, the white line calculation section 21 narrows down the white line candidate having the greatest likelihood from the white line candidates calculated in S13, based on the calculated likelihood of a white line (S14).

Next, the parameter estimation section 22 calculates an estimation value of a current road parameter based on the white line candidate narrowed down in S14 and the predicted value predicted from the estimation value of road parameters previously estimated (S15). In this case, when a reset flag described later has been turned on, the parameter estimation section 22 calculates the estimation value of the road parameter by using the predicted value of the curvature change rate $\rho 2$ reset to zero, and thereafter the reset section 24 returns the reset flag to an off state.

Next, the curve departure determination section 23 determines whether or not the vehicle 50 is departing from a curve, that is, whether or not the vehicle 50 is present at the exit of the curve (S16). If the curve departure determination section 23 determines that the vehicle 50 is present at the exit of the curve (S16: YES), the reset section 24 changes the reset flag, which resets the predicted value of the curvature change rate $\rho 2$ to zero, from the off state to an on state (S17). Hence, in the next processing period, in S15, the parameter estimation section 22 calculates an estimation value of the road parameter by using the predicted value of the curvature change rate $\rho 2$ reset to zero. In contrast, if the curve departure determination section 23 determines that the vehicle 50 is not present at the exit of the curve (S16: NO), the reset section 24 makes the reset flag remain the off state.

Next, the vehicle control unit 30 performs steering control based on the estimation value of the road parameter calculated in S15 (S18). Then, the present process ends. Note that the steps S10 to S17 are performed by the ECU 20, and the step S18 is performed by the vehicle control unit 30.

According to the first embodiment described above, the following advantages can be provided.

If the departure of the vehicle 50 from a curve of a lane is determined, the predicted value of the curvature change rate $\rho 2$ is reset. Hence, when the vehicle 50 departs from the curve, the predicted value of the curvature change rate $\rho 2$ affected by the road parameter of the curve section is reset. This can suppress overshoot of the estimation value of the lane curvature $\rho 1$ when the vehicle 50 departs from the curve. Furthermore, accuracy in estimating the lane curvature $\rho 1$ can be increased when the vehicle 50 departs from the curve.

Departure of the vehicle 50 from the curve of the lane can be determined by using at least one of the estimated lane curvature $\rho 1$, the yaw rate of the vehicle 50, and the steering angle of the vehicle 50.

When the vehicle 50 departs from a curve, steering control of the vehicle 50 is performed based on the lane curvature $\rho 1$, overshoot of which is suppressed. Hence, the falter of the vehicle 50 can be reduced.

Second Embodiment

A traveling path estimation apparatus according to the second embodiment will be described. In the second embodiment, parts of the traveling path estimation apparatus different from those of the first embodiment will be described. To address the overshoot of the estimation value of the lane curvature $\rho 1$ when the vehicle 50 departs from the curve, the lane curvature $\rho 1$ makes the largest contribution next to the curvature change rate $\rho 2$ among the previously estimated road parameters.

Figure 7:
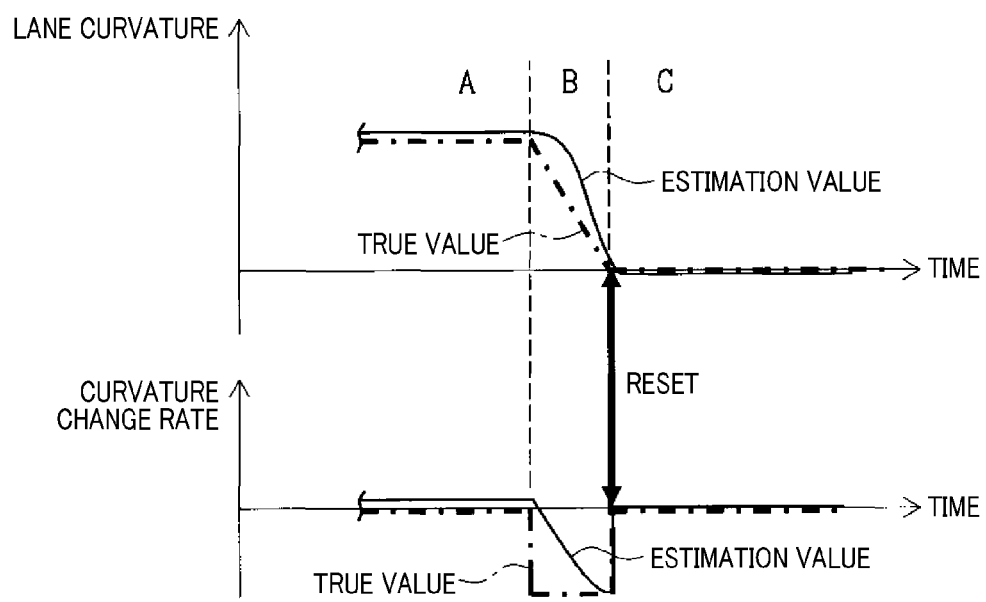
FIG. 7 is a diagram illustrating estimation values of a curvature and a curvature change rate according to a second embodiment.

Hence, when the curve departure determination section 23 determines the departure of the vehicle 50 from a curve, the reset section 24 of the ECU 20 according to the second embodiment resets the estimation value of the curvature change rate $\rho 2$ previously estimated (in the past) and the estimation value of the lane curvature $\rho 1$ previously estimated (in the past). In the present embodiment, when the departure of the vehicle 50 from the curve is determined, the reset section 24 resets the predicted value of the lane curvature $\rho 1$ in addition to the predicted value of the curvature change rate $\rho 2$ to zero. That is, the influence of the history of the lane curvature $\rho 1$ in the clothoid curve section is eliminated. Hence, as shown in FIG. 7, the overshoot is almost entirely suppressed which remains, in the first embodiment, in the estimation value of the lane curvature $\rho 1$ immediately after the vehicle 50 has entered the straight line section.

Figure 6:
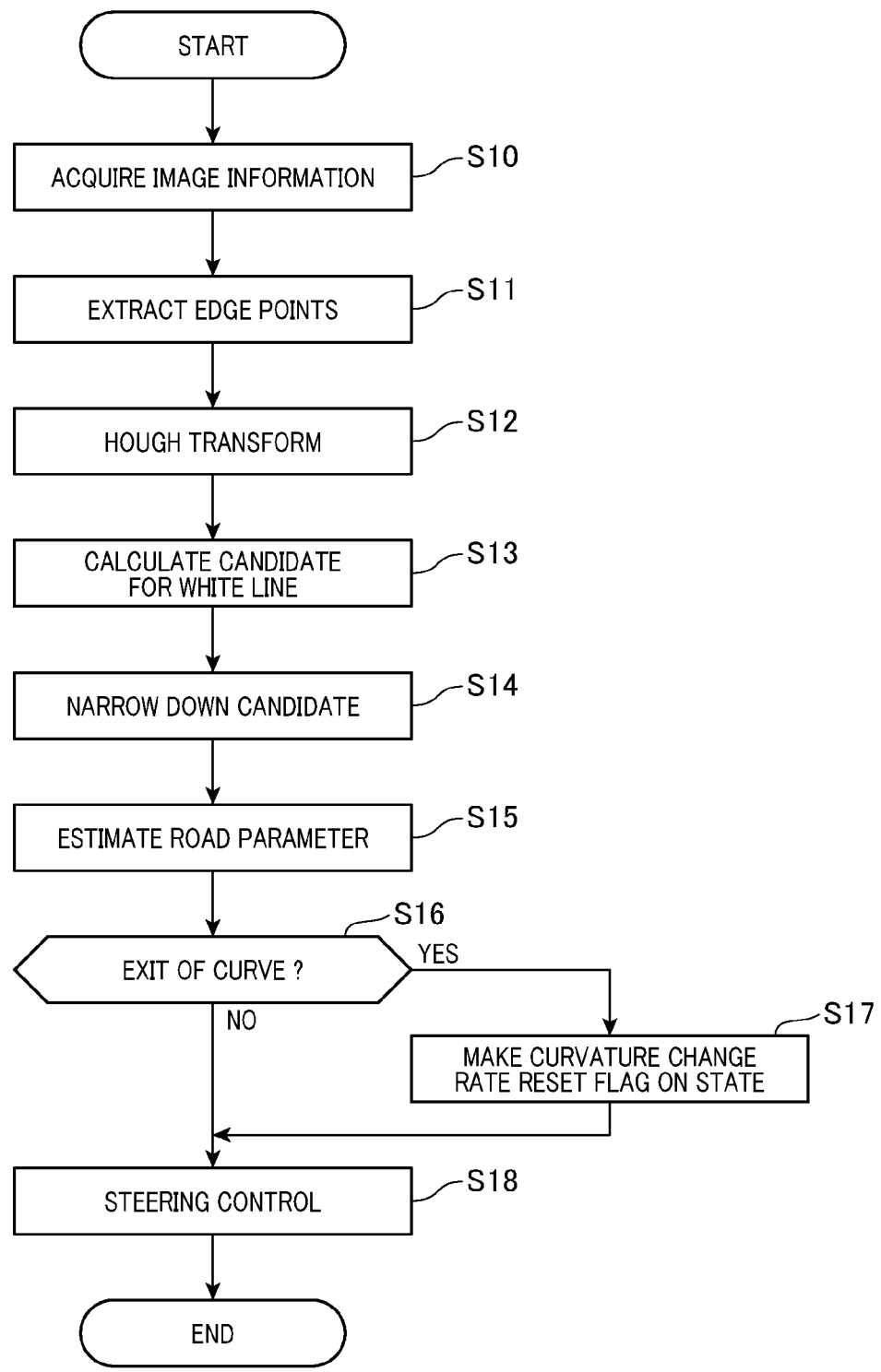
FIG. 6 is a flowchart of a procedure for controlling the vehicle.

In the present embodiment, in the step of S17 of the flowchart shown in FIG. 6, the reset section 24 makes the reset flag, which resets the predicted value of the curvature change rate $\rho 2$ and the predicted value of the lane curvature $\rho 1$ to zero, from an off state to an on state. In addition, in the step of S15, when the reset flag is in an on state, the parameter estimation section 22 calculates the estimation value of the road parameter by using the predicted value of the curvature change rate $\rho 2$ reset to zero and the predicted value of the lane curvature $\rho 1$ reset to zero, and thereafter the reset section 24 returns the reset flag to an off state.

According to the second embodiment described above, the following advantages can be provided in addition to the advantages similar to those of the first embodiment.

When the vehicle 50 departs from the curve, the predicted value of the lane curvature $\rho 1$ is also reset. This can suppress overshoot of the estimation value of the lane curvature $\rho 1$ when the vehicle 50 departs from the curve. Furthermore, accuracy in estimating the lane curvature $\rho 1$ can be further increased when the vehicle 50 departs from the curve.

Other Embodiments

The parameter estimation section 22 may estimate higher-order differential values, from second-order to Nth-order (N is a natural number equal to or more than 2), of the lane curvature $\rho 1$ as a road parameter. This can further increase accuracy in estimating the lane curvature $\rho 1$ in the clothoid curve section. In this case, when the departure of the vehicle 50 from the curve is determined, the reset section 24 resets the second-order differential value of the previously estimated lane curvature $\rho 1$ to zero. Hence, accuracy in estimating the curvature change rate $\rho 2$ can be increased when the vehicle 50 departs from the curve. Furthermore, accuracy in estimating the lane curvature $\rho 1$ can be increased when the vehicle 50 departs from the curve. In addition, when a higher-order differential value, equal to or more than third order, of the lane curvature $\rho 1$ is estimated as a road parameter, resetting the previously estimated higher-order differential value, equal to or more than third order, to zero can further increase accuracy in estimating the lane curvature $\rho 1$. Note that the first-order differential value of the lane curvature $\rho 1$ corresponds to the curvature change rate $\rho 2$.

When resetting the predicted value of the curvature change rate $\rho 2$, the predicted value of the lane curvature $\rho 1$, and the predicted value of the higher-order differential value of the lane curvature $\rho 1$, the reset section 24 may reset them to smaller values which can be assumed to be zero, without actually resetting them to zero.

The traveling path estimation apparatus may use the estimated road parameters for processes other than the steering control. When the estimated road parameters are used for processes other than the steering control, the vehicle control unit 30 may not be included. In addition, when the steering control is not performed, a steering angle sensor, which is not shown, may detect a steering angle to determine the departure of the vehicle 50 from a curve based on the detected steering angle.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a traveling path estimation apparatus includes: a calculation section that calculates a traveling marking line marking a lane of a road, on which a vehicle (50) runs, based on a front image acquired by a camera (10) mounted in the vehicle; an estimation section that estimates road parameters including a curvature and a curvature change rate of the lane, the estimation section estimating the road parameters at current time (current road parameters) based on the traveling marking line calculated by the calculation section and the road parameters previously estimated; a determination section that determines departure of the vehicle from a curve of the lane; and a reset section that, when the determination section determines the departure of the vehicle, resets at least the curvature change rate included in the road parameters previously estimated by the estimation section.

According to the embodiment, a traveling marking line of a road is calculated based on a front image acquired by a camera mounted in the vehicle. Then, road parameters at current time are estimated based on the calculated traveling marking line and the road parameters previously estimated. The estimated road parameters include a curvature and a curvature change rate of a lane. Additionally, departure of the vehicle from a curve of the lane is determined. Then, when the departure of the vehicle from the curve of the lane is determined, at least the curvature change rate included in the road parameters previously estimated is rest. Hence, since the curvature change rate estimated in a curve section is reset when the vehicle departs from the curve, overshoot of the estimation value of the curvature can be suppressed when the vehicle departs from the curve. Furthermore, accuracy in estimating the curvature can be increased when the vehicle departs from the curve.

What is claimed is:

1. A traveling path estimation apparatus, comprising:
   a calculation section that calculates a traveling marking line marking a lane of a road, on which a vehicle runs, based on a front image acquired by a camera mounted in the vehicle;
   an estimation section that estimates road parameters including a curvature and a curvature change rate of the lane, the estimation section estimating the road parameters at current time based on the traveling marking line calculated by the calculation section and road parameters previously estimated within a current drive cycle as the road parameters estimated at current time;
   a determination section that determines a departure of the vehicle from a curve of the lane; and
   a reset section that, when the determination section determines the departure of the vehicle, resets at least the curvature change rate included in the road parameters previously estimated by the estimation section.

2. The traveling path estimation apparatus according to claim 1, wherein
   when the determination section determines the departure, the reset section resets the curvature previously estimated by the estimation section.

3. The traveling path estimation apparatus according to claim 1, wherein
   the road parameters include higher-order differential values, from second-order to Nth-order (N is a natural number equal to or more than 2), of the curvature, and
   when the determination section determines the departure, the reset section resets the higher-order differential values previously estimated by the estimation section.

4. The traveling path estimation apparatus according to claim 1, wherein
   the determination section determines the departure by using at least one of the curvature estimated by the estimation section, a yaw rate of the vehicle, and a steering angle of the vehicle.

5. The traveling path estimation apparatus according to claim 1, further comprising a control section that performs steering control of the vehicle based on the road parameters estimated by the estimation section.

6. The traveling path estimation apparatus according to claim 1, wherein
   when the determination section determines the departure, the reset section resets the curvature change rate previously estimated by the estimation section to zero.

7. The traveling path estimation apparatus according to claim 1, wherein
   when the determination section determines the departure, the reset section resets the curvature previously estimated by the estimation section to zero.

8. The traveling path estimation apparatus according to claim 1, wherein
   the traveling path estimation apparatus is installed in the vehicle which runs on a straight line section of the lane after departure of the vehicle from the curve of the lane.

9. The traveling path estimation apparatus according to claim 8, wherein
   after the curvature change rate is reset after departure of the vehicle from the curve of the lane, the road parameter is corrected based on a condition of the straight line section.

10. A method for estimating a traveling path of a vehicle, the method comprising:
    calculating a traveling marking line marking a lane of a road, on which a vehicle runs, based on a front image acquired by a camera mounted in the vehicle;
    estimating road parameters including a curvature and a curvature change rate of the lane;
    estimating the road parameters at current time based on the traveling marking line and road parameters previously estimated within a current drive cycle as the road parameters estimated at current time;
    determining a departure of the vehicle from a curve of the lane; and
    resetting, when determining the departure of the vehicle, at least the curvature change rate included in the road parameters previously estimated.

11. A system for estimating a traveling path of a vehicle comprising:

a central processor;
a computer-readable storage medium; and
a set of computer-executable instructions stored on the computer-readable storage medium that cause the central processor to implement:
  calculating a traveling marking line marking a lane of a road, on which a vehicle runs, based on a front image acquired by a camera mounted in the vehicle;
  estimating road parameters including a curvature and a curvature change rate of the lane;
  estimating the road parameters at current time based on the traveling marking line and road parameters previously estimated within a current drive cycle as the road parameters estimated at current time;
  determining a departure of the vehicle from a curve of the lane; and
  resetting, when determining the departure of the vehicle, at least the curvature change rate included in the road parameters previously estimated.

* * * * *